(12) United States Patent
Murata

(10) Patent No.: US 7,328,193 B2
(45) Date of Patent: Feb. 5, 2008

(54) SUMMARY EVALUATION APPARATUS AND METHOD, AND COMPUTER-READABLE RECORDING MEDIUM IN WHICH SUMMARY EVALUATION PROGRAM IS RECORDED

(75) Inventor: Masaki Murata, Tokyo (JP)

(73) Assignee: National Institute of Information, Tokyo (JP)

( * ) Notice: Subject to any disclaimer, the term of this patent is extended or adjusted under 35 U.S.C. 154(b) by 429 days.

(21) Appl. No.: 10/352,004

(22) Filed: Jan. 28, 2003

(65) Prior Publication Data

US 2003/0167245 A1 Sep. 4, 2003

(30) Foreign Application Priority Data

Jan. 31, 2002 (JP) ............................. 2002-023493

(51) Int. Cl.
G06F 15/18 (2006.01)
G06F 17/21 (2006.01)
G06F 17/00 (2006.01)
G06F 15/00 (2006.01)
G06F 17/28 (2006.01)

(52) U.S. Cl. .................. 706/12; 704/4; 704/9; 706/11; 706/13; 706/14; 706/47; 715/531

(58) Field of Classification Search ............ 706/11–14, 706/47; 704/4, 9; 707/1, 6, 7
See application file for complete search history.

(56) References Cited

U.S. PATENT DOCUMENTS 5,778,397 A * 7/1998 Kupiec et al. .............. 715/500
7,017,114 B2 * 3/2006 Guo et al. ................... 715/531
7,120,613 B2 * 10/2006 Murata ........................ 706/12
2002/0078091 A1 * 6/2002 Vu et al. ..................... 707/513
2002/0159642 A1 * 10/2002 Whitney ..................... 382/225
2003/0083859 A1 * 5/2003 Murata ........................... 704/1

OTHER PUBLICATIONS

Manabu Okumura et al., "Automated Text Summarization: A Survey", School of Information Science, Japan Advanced Institute of Science and Technology, vol. 6, Jul. 1999, pp. 1-26.

Nobata, et al., "System of Extracting Key Sentences Using Integrated Multiple Rating Scale For Evaluation, Proceedings of The Seventh Annual Meeting of the Association for Natural Language Processing", pp. 301-304, published Mar. 27, 2001.

(Continued)

Primary Examiner—Anthony Knight
Assistant Examiner—Sunray Chang
(74) Attorney, Agent, or Firm—Staas & Halsey LLP

(57) ABSTRACT

The apparatus according to the present invention stores examples constituted by an article, a summary of the article and an evaluation of the summary in a solution data storage unit. Groups of sets of solutions and features are extracted from the stored examples and what kind of solution is the most straightforward for which case is learned using machine learning techniques, with the results of this learning being stored in the learning results data storage unit. Sets of features are then extracted from the inputted summary and what kind of solution is the most easily attained in the case of the extracted set of features is extrapolated and outputted as an evaluation.

6 Claims, 3 Drawing Sheets

OTHER PUBLICATIONS

Masaki Murata et al., Experiments on Word Sense Disambiguation Using Several Machine-Learning Methods, Society for Language Analysis in Electronic Information Communication Studies and Communications, NCL2002-2, pp. 8-10, published May 4, 2001.

Nello Cristianini et al., An Introduction to Support Vector Machines and Other Kernel-based Learning Methods, Cambridge University Press, published 2000.

Taku Kudoh, TinySVM: Support Vector Machines, disclosed 2000.

* cited by examiner

自然言語では，動詞を省略するということがある。この省略された動詞を復元することは，対話システムや高品質の機械翻訳システムの実現には不可欠なことである。そこで本研究では，この省略された動詞を表層の表現（手がかり語）と用例から補完することを行なう。解析のための規則を作成する際，動詞の省略現象を補完する動詞がテキスト内にあるかいなかなどで分類した。小説を対象にして実験を行なったところ，テストサンプルで再現率８４％，適合率８２％の精度で解析できた。このことは本手法が有効であることを示している。テキスト内に補完すべき動詞がある場合は非常に精度が良かった。それに比べ，テキスト内に補完すべき動詞がない場合はあまり良くなかった。しかし，テキスト内に補完すべき動詞がない場合の問題の難しさから考えると，少しでも解析できるだけでも価値がある。また，コーパスが多くなり，計算機の性能もあがり大規模なコーパスが利用できるようになった際には，本稿で提案した用例を利用する手法は重要になるだろう。

(There are cases in natural language where a writer omits a verb. A dialog system or high-quality machine translation system is necessary in order to restore the omitted verb. At this research center, the omitted verb is compensated for with surface case representation (key language) and examples. When making rules for analysis, classifications are made using whether or not a verb compensating for the verb omission phenomena exists within the text. Analysis was achieved with an accuracy of a recall factor of 84% and a relevance factor of 82% with a test sample when carrying out experimentation aimed at novelists. This shows that this method is valid. The Precision is particularly good in the case of verbs to be compensated for within the text. In comparison to this, the quality is excellent in cases where there is no verb to be compensated for within the text. However, taking into consideration the difficulty of problems where there is not verb to be compensated within the text, this still has value in providing a little understanding. When making the corpus large and raising the performance of the calculating function so that a large scale corpus can be utilized, the method utilizing the example proposed in this document is extremely important. )

FIG.3

SUMMARY EVALUATION APPARATUS AND METHOD, AND COMPUTER-READABLE RECORDING MEDIUM IN WHICH SUMMARY EVALUATION PROGRAM IS RECORDED

CROSS-REFERENCE TO RELATED APPLICATIONS

This application claims priority from Japanese patent application Ser. No. 2002-23493 filed Jan. 31, 2002, the contents of which are incorporated by reference herein.

BACKGROUND OF THE INVENTION

1. Field of the Invention

The present invention relates to technology for evaluating a summary of an article, a document or the like using a computer. More specifically, the present invention relates to technology for automatically performing evaluation processing of summaries of articles using supervised machine learning methods.

2. Description of the Related Art

In recent years, processing to automatically summarize an article or a document using a computer has become more widespread as information technology has developed. This has meant that correct evaluation of summaries made using various automatic summary processing methods has also become more and more important.

Summary processing can mainly be classified into two types, summarizing by extracting important sentences from a target article and summarizing by freely generating sentences based on content of a target article. Summarizing by extracting important sentences is processing where sentences present in a target article are extracted according to a prescribed summarizing rate so as to compose a summary. Summarizing by generating sentences freely is processing where a person generates sentences freely standing on content of a target article.

As a way of evaluating summarizing by extracting important sentences, it is possible to evaluate by automatically processing using information which sentences should be extracted from an article. For example, a degree of importance indicating the extent to which a sentence should be extracted as a summary is pre-assigned to each sentence in the article, and the summary is then evaluated by adding up the degrees of importance of each extracted sentence. On the other hand, it is difficult to automatically evaluate a summary composed freely. This is because it is probable that a number of appropriate summaries should be obtained for a single article and it is therefore very difficult to prepare correct information for all appropriate summaries.

In the related art, then, evaluation of summaries composed freely by hands has been carried out based on a person's knowledge or experience. A method shown in the following cited reference 1 exists as a method for automatically evaluating summaries in the related art. In the processing method of cited reference 1, summary evaluation is carried out using the recall ratio, relevance ratio, F value based on the conformity rate between sentences extracted by processing of a computer and important sentences selected by a person in advance.

Evaluation can also be discerned for freely made summaries by determining the degree of similarity between the made summary and a correct summary prepared by a person in advance using frequency vectors for words.

"Cited reference 1: Shu Nobata Et. al, Important sentence extraction system integrating a plurality of evaluation criteria, Proceedings of the seventh annual conference of the Language Processing Society, pp301-304, 2001 (野畑周他，複数の評価尺度を統合的に用いた重要文抽出システム 言語処理学会第7回年次大会発表論文集)".

In the processing for evaluating the freely made summary shown in cited reference 1, the degree of similarity with a target summary and a prepared correct summary is determined using word frequency vectors. There is therefore a tendency that the evaluation value of the summary becomes high if the distribution of keywords showing the content of the summary is similar to the distribution of keywords for a summary taken to be correct. Namely, if a summary includes certain words existing in the correct summary, this summary will receive a fixed good evaluation even if the form of this summary as a passage is extremely difficult to read. It is therefore of a problem that this kind of summary receives evaluation as a good summary.

In the related art, a specialist evaluates a summary composed by hands. However, it goes without saying that evaluation by a specialist depends upon the experience and skill of the evaluator. There are therefore cases where the evaluation for the same summary may differ when the evaluator is different or where the evaluation differs because the period for evaluation is different even when the evaluator is the same. Thus, when a summary by hands is evaluated based on the experience and skill of the specialist as in the related art, there is no reproducibility of evaluation of the summary but much difficulty of impartial evaluation of the summary.

Automatic evaluation processing for summaries including free-composed summaries which is not influenced by the subjectivity of the evaluator and where an objective evaluation that can be reproduced is required.

Comparison of evaluations of summaries automatically generated by a computer and summaries freely composed by a specialist is now considered. Summaries generated by a computer are generally lower in summary accuracy with regards to appropriateness of the summarized content and fluency of the sentences than summaries composed by a person. There are therefore many cases where the naturalness of a summary produced by a computer is not to the extent that it is not possible to discern the summary from a summary produced by a person.

On the assumption that "A good summary" means the provision of a summary which is natural to the extent that it is difficult to discriminate between this summary and a summary by hands, this "A good summary" means providing a summary which is good to the extent that the sentence structure and summary content of the summary produced by computer is similar to that of a summary produced by a person. It can therefore be understood that categorizing by "a summary by a computer" and "a summary by hands" can be used as an evaluation of a summary.

SUMMARY OF THE INVENTION

It is therefore the object of the present invention to provide a method for automatically performing processing to evaluate not only summaries by extracting important sentences but also summaries by generating freely using a computer.

It is another object of the present invention to provide an apparatus implemented this processing method.

It is another object of the present invention to provide a computer-readable recording medium in which a program to execute this automatic summary evaluation processing on a computer is recorded.

It is a further object of the present invention to provide a method for putting types of processing means for obtaining summaries into classifications and performing processing to automatically evaluate summaries using these classifications, to provide an apparatus for implementing this processing, and a program for executing this processing on computer.

The present invention is therefore provided with a summary evaluation method comprises the steps of accessing solution data storage means for storage solution data constituted by a group of a problem constituted by an article and a summary thereof and a solution constituted by an evaluation of the summary, acquiring the solution data from the solution data storage means, extracting features from the problem of the solution data and creating groups of sets of solutions and features, learning what kind of solution is the easiest for the time of what kind of feature from the groups of sets of solutions and features using a supervised machine learning method and storing the results of the learning, extracting sets of features from the inputted text, and extrapolating what kind of solution is the most easily attained in the case of the extracted sets of features obtained from the feature extraction means based on the results of the learning.

The present invention is therefore provided with a summary evaluation apparatus comprises solution data storage means for storing solution data constituted by a group of a problem constituted by an article and a summary thereof and a solution constituted by an evaluation of the summary, solution/feature pair extraction means for acquiring the solution data and extracting features from the problem of the solution data and creating groups of sets of solutions and features, machine learning means for learning what kind of solution is the easiest for the time of what kind of feature from the groups of sets of solutions and features using a supervised machine learning method and storing the results of the learning, feature extraction means for extracting sets of features from the inputted text, and evaluation extrapolation means for extrapolating what kind of solution is the most easily attained in the case of the extracted sets of features obtained from the feature extraction step based on the results of the learning.

In the present invention, there is provided a computer-readable recording medium in which recording a summary evaluation program causing a computer to execute the steps of this summary evaluation method.

In the present invention, a large amount of solution data constituted by examples assigned with solutions constituted by evaluations of summaries for each summary generated by machine and each summary created by a person is prepared in advance. Groups of sets of solutions and features are extracted for each example, and what kind of solution (summary evaluation) is the most easily attained at the time of what kind of feature is learned from the extracted groups of sets of solutions and features using machine learning techniques. After this, when a summary constituting a subject is inputted, sets of features are extracted from the inputted summary and the summary is then evaluated by extrapolating what kind of solution is easily attained for the case of what kind of set of features by referring to the results of the machine learning.

In this way it is possible to provide a reproducible unbiased evaluation without being subject to the influence of the experience or skill of the evaluator. For example, the two classifications of "summary by machine" which means a summary is generated using a computer and "summary by hands" which means a summary is composed by a person can be used as solutions assigned to the solution data. In this case, in the present invention, a determination is made as to whether or not the inputted summary is a "summary by machine" or a "summary by hands". These two classifications may be assigned by machine processing using a processing computer so as to be automatically acquired from the summaries themselves prepared as solution data or may be assigned by a person. The processing load involved in assigning solutions can be alleviated when classifications are assigned through machine processing. When the accuracy of the solution data is considered, it is also possible to use solution data where the solution is assigned by a specialist. In this case, it is also possible to assign three or five classifications according to the evaluation in order to carry out multi-stage evaluations such as three stage, five stage evaluations, or the like.

The program implementing each of the means, functions or elements of the present invention on a computer may be stored on an appropriate recording medium readable by computer such as portable memory media, semiconductor memory, or a hard disc, etc., and may be provided through recording on such a recording media, or through exchange utilizing various communications networks via a communications interface.

BRIEF DESCRIPTION OF THE DRAWINGS

FIG. 3 is a view showing an example of text to be subjected to processing.

DETAILED DESCRIPTION OF THE PREFERRED EMBODIMENTS

Figure 1:
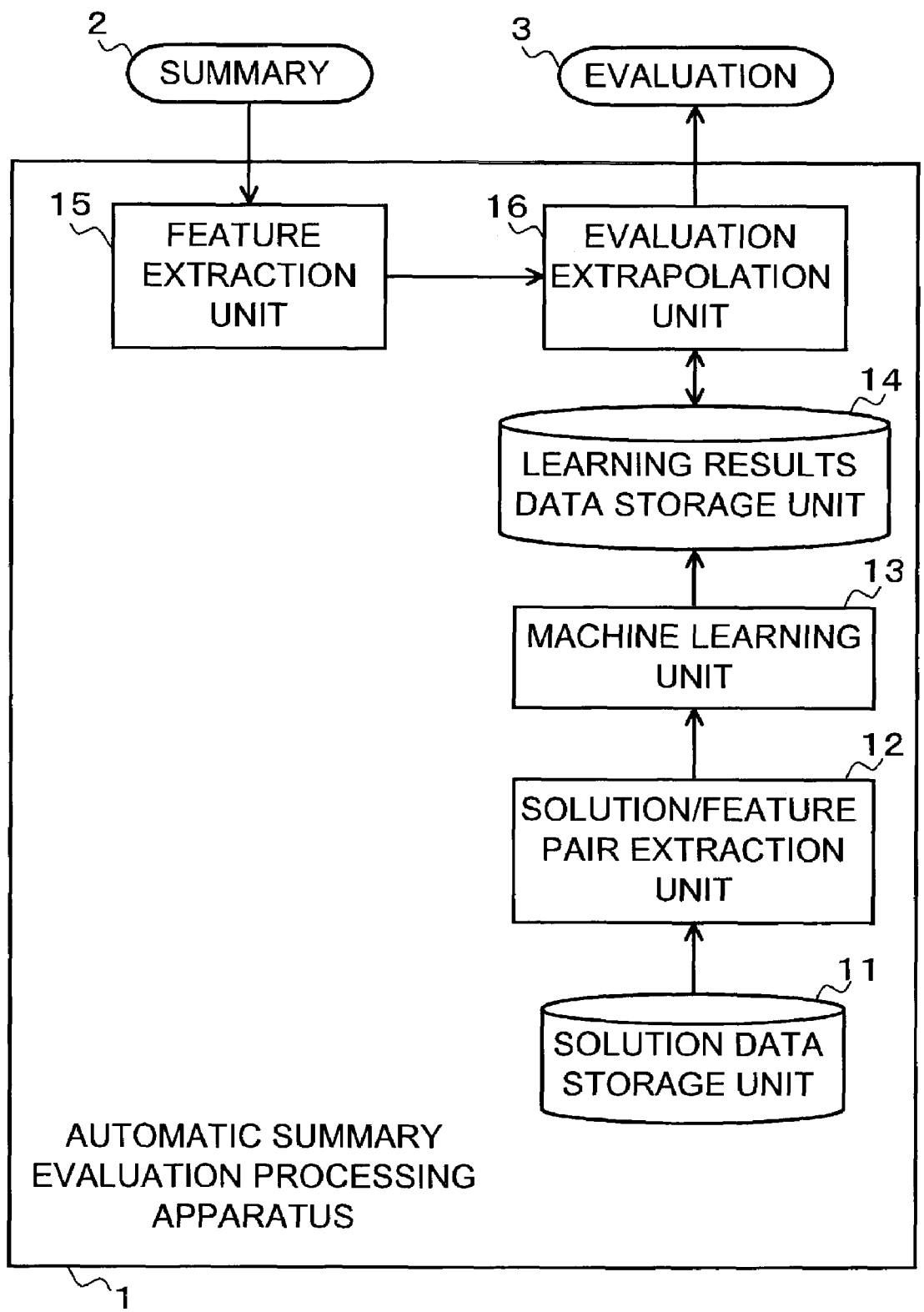
FIG. 1 is a view showing an example configuration for an apparatus of the present invention.

The following is a description of a preferred embodiment of the present invention. FIG. 1 is a view showing an example configuration for an apparatus of the present invention. An automatic summary evaluation processing apparatus 1 comprises a solution data storage unit 11, a solution/feature pair extraction unit 12, a machine learning unit 13, a learning results data storage unit 14, a feature extraction unit 15, and an evaluation extrapolation unit 16.

The solution data storage unit 11 is means for storing data (solution data) constituting supervised data used in machine learning processing. Examples constituted by sets of problems and solutions are stored in the solution data storage unit 11 as solution data. A problem consists of an article (text data) previous to summarizing and the summary itself. Here, the article means text data comprising one or a plurality of sentences or paragraphs such as a document, a news article, a thesis or the like. A summary may be made either by a computer or by a person. A solution is an evaluation of a summary, with there being two classifications, "summary produced by a computer (summary by a computer)" and "summary produced by a person (summary by hands)". The two classifications may be automatically assigned from a kind of processing technique for generating a summary or may be assigned by a person. The reason the two classifications of "summary by a computer" and "summary by hands" are used as solutions is so that classifications can be assigned mechanically based on the processing means generating the summary. Namely, the solution (classification) of "summary by a computer" is automatically assigned to a summary that a computer automatically generates. Solution data assigned with the solution "summary by hands" is used for a summary composed by a person. This alleviates the processing load involved in assigning solutions. Further, when accuracy of the solution is important, a solution may be assigned to each example by a specialist.

The solution/feature pair extraction unit 12 is means for extracting groups of sets of solutions and features from each example stored in the solution data storage unit 11. A feature may be extracted as (1) information indicating whether or not a sentence is fluent, (2) information indicating whether or not content is well expressed, (3) characteristic information used in automatic summarizing, and the like.

(1) As information indicating the fluency of a sentence, percentages of presence of a k-gram morph sequence or a degree of semantic coincidence between modifying clauses in the solution data storage unit 11 which may be implemented as a corpus may be extracted.

(2) As information indicating whether or not the content of the target article is well expressed, rates of inclusion of key-phrases existed in the article previous to summarizing are extracted.

Further, (3) the position of a sentence, information whether or not a sentence is a lead sentence, TF/IDF (Term Frequency/Inversed Document Frequency), sentence length, or the existence of key expressions such as characteristic expressions/conjunctions/function words and the like are extracted as characteristic information used in automatic summarizing.

The machine learning unit 13 is means for learning what kind of solution is the most straightforward for the time of what kind of feature from the groups of sets of solutions and features extracted by the solution/feature pair extraction unit 12 using a supervised machine learning method. The results of this learning are then stored in the learning results data storage unit 14. Processing may be carried out using this kind of method providing that the machine learning unit 13 employs a supervised machine learning technique. Such technique may be, for example, a decision tree technique, a support vector technique, a parameter tuning technique, a simple Baysian technique, a maximum entropy technique, or a decision list technique.

The feature extraction unit 15 is means for extracting a collection of features from a summary 2 of an evaluation target, and passing the extracted collection of features over to the evaluation extrapolation unit 16.

The evaluation extrapolation unit 16 is means for referring to learning results data of the learning results data storage unit 14 and extrapolating results for which a solution (evaluation) is the most straightforward when sets of features are passed from the feature extraction unit 15, and outputting an evaluation 3 constituted by the extrapolation results.

Figure 2:
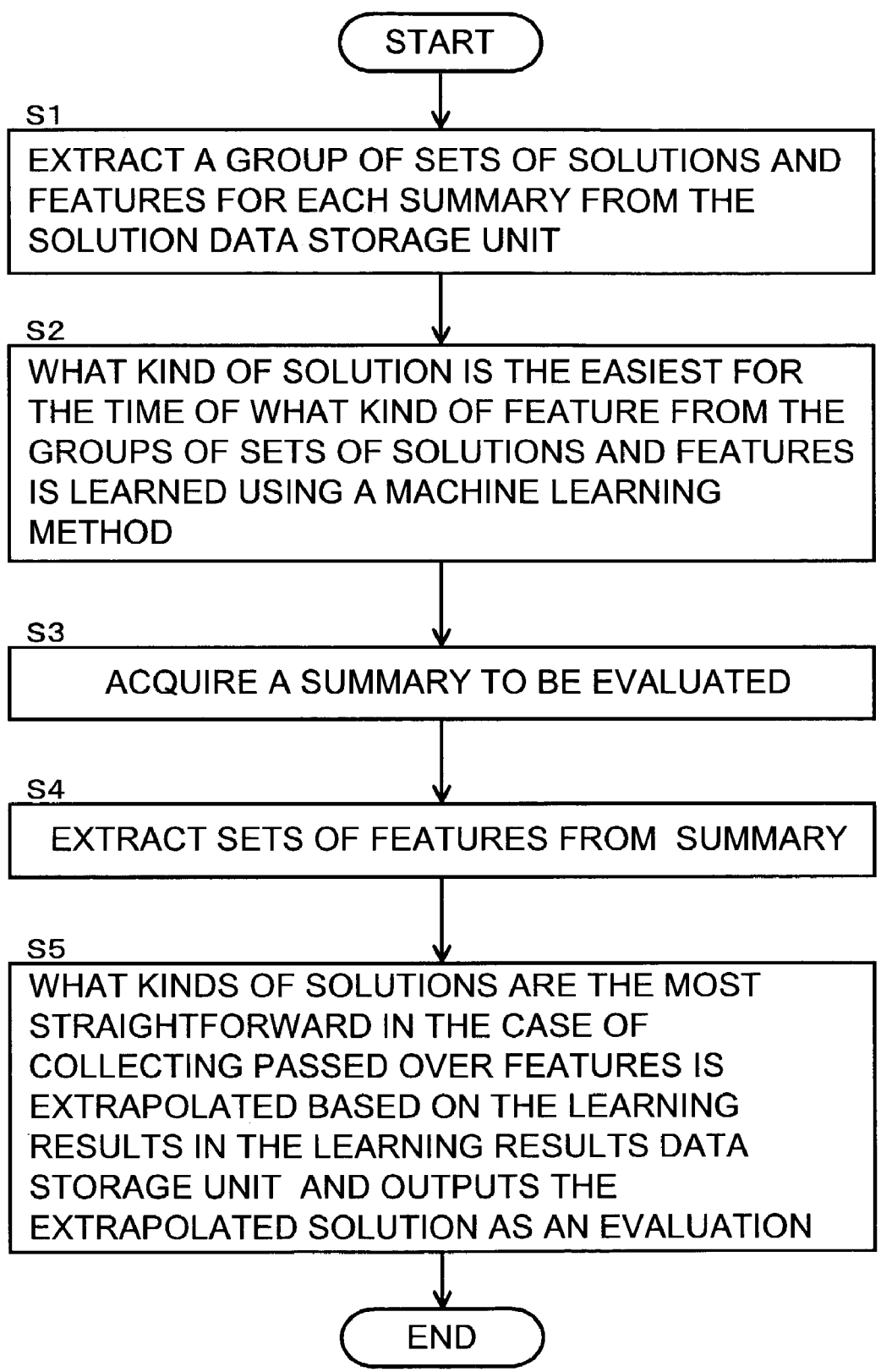
FIG. 2 is a view showing a process flow of the present invention.

A process flow for the present invention is shown in FIG. 2. A large number of examples where solution information is assigned to data for a plurality of languages are stored at the solution data storage unit 11 of the automatic summary evaluation processing apparatus 1 as solution data. For example, an example of text taken as input is shown in FIG. 3.

First, at the solution/feature pair extraction unit 12, a group of a set of a solution and a feature is extracted from the solution data storage unit 11 for each example (step S1). For example, the following are extracted as features:

feature e1: presence of a k-gram morph sequence in the corpus;

feature e2: degree of semantic coincidence between modifying clauses;

feature e3: rate of inclusion of "natural language wording" with large TF/IDF values after summarizing;

feature e4: determination as to whether or not the first sentence of the inputted article is being used;

feature e5: length of outputted summary; and feature e6: determine as to whether or not there is conjunction "tsumari (in other words)" directly before the location where the summary is extracted.

The solution/feature pair extraction unit 12 checks whether or not a k-gram morph sequence, for example, a three-gram morpheme of "動詞を(doushi-wo) <|>する(suru) (where <|> shows a partition)" which is omitted "省略(syouryaku)" from "動詞を(doushi-wo) <|>省略(syouryaku) <|>する(suru)" appears in the corpus as a feature e1 for each example and extracts this when present. If the morph sequence "動詞を(doushi-wo) <|>する(suru)" does not appear in the corpus, it is deduced that this is because this expression does not smoothly appear as a sentence. The presence of a k-gram morph sequence in the corpus can be utilized as a feature e1 so as to determine the smoothness of the summary.

The solution/feature pair extraction unit 12 extracts a degree of coincidence between modifying clauses as the feature e2 by checking as to, for example, whether or not a clause "動詞を(doushi-wo)" modifying to a clause "する(suru)" exists in the corpus for "動詞を(doushi-wo) <|>する(suru)" which is omitted "省略(syouryaku)" from "動詞を(doushi-wo) <|>省略(syouryaku) <|>する|(suru)". When there is no modification between "動詞を(doushi-wo)" and "する(suru)", it can be deduced that this expression is not a smooth sentence.

The solution/feature pair extraction unit 12 extracts, for example, a key phrase inclusion rate pertaining as to whether or not key phrases (words of phrases of natural language) present in the article previous to summarizing are included in the summary as the feature e3. When as many of these key phrases as possible are included in the summary, it can be determined that the summary is a good summary that accurately expresses the content of this article.

TF/IDF techniques can mainly be used for key phrase automatic extraction processing. TF is a value indicating the number of appearances or frequency of a word in an article. IDF is the inverse of the number of documents in a group of a large number of documents already possessed that a word appears in. Typically, words for which the sum of the TF and IDF is large are appropriate to be taken as key phrases. It is assumed that "自然言語(shizen gengo) (natural language)", "動詞(doushi)(verb)", "省略(syouryaku) (omission)", "復元(fukugen) (restoration)", "表層の表現(hyousou-no hyougen) (surface case representation)" and "用例(yourei) (example)" correspond to key phrases in the article shown in FIG. 3. These words are important words when expressing the content of this text and the appearance of these words in the summary is therefore desirable.

The solution/feature pair extraction unit 12 extracts words constituting the aforementioned kind of key phrases using, for example, TF/IDF techniques. It is then checked as to whether or not the TF or IDF values are high and whether or not these words are included in the summary, and the inclusion rate for these words is extracted as the feature e3.

The solution/feature pair extraction unit 12 then extracts a determination as to whether or not the first sentence of the inputted text is being used as the feature e4. Cases where important sentences occur towards the beginning of an article are typically very common. It can therefore be determined that good summaries can be achieved when using sentences near the beginning of a document as a summary.

The solution/feature pair extraction unit 12 also checks the length of the summary and extracts this length as the feature e5. The target of the summary is typically for the sentences to be short. A short summary can therefore be determined to be a good summary.

The solution/feature pair extraction unit 12 also extracts a determination as to whether or not there is a conjunction "つまり(tsumari) (in other words)" or the like directly before the location extracted as the summary as the feature e6. Key expressions such as conjunctions, function words indicating sentences and locations that are desirable for extraction as summaries also exist. For example, when a conjunction "tsumari" or the like exists, an expression summarizing the content of this text exists follows this conjunction "tusmari". This means that a good summary can be determined when this portion is extracted.

The machine learning unit 13 then learns what kind of solution is the easiest, namely the most easily attained, for the time of what kind of feature from the groups of sets of solutions and features extracted by the solution/feature pair extraction unit 12 (for example, "summary by a computer" or "summary by hands") using machine learning method (step S2). The machine learning unit 13 employs, for example, a simple Baysian approach, decision list technique, a maximum entropy method or a support vector machine method or the like as the supervised machine learning method.

The simple Baysian approach is an approach where the probability for each classification is extrapolated based on the Bayes theorem, with the classification for which the probability value is the highest then being adopted as the classification.

Decision list technique defines groups consisting of features and classifications for storage in a list of a predefined order of priority. When input to be subjected to detection is then provided, the inputted data and the defined features are compared in order from the highest priority using the list. Defined classifications where features match are then taken as the input classification.

In the maximum entropy method, when preset sets of features fj (1 ≦j≦k) are taken to be a F set, probability distribution for when an expression signifying entropy is a maximum while prescribed constraints are fulfilled is obtained, with classifications having larger probability values then being obtained for the probabilities for each classification obtained in accordance with this probability distribution.

The support vector machine method is a method where data is classified from two classifications by dividing space up into a hyperplane.

The decision list technique and the maximum entropy method are described in cited reference 2 in the following, and the support vector machine method is described in the following cited references 3 and 4.

"Cited Reference 2: Society for language analysis in electronic information communication studies and communications, NCL 2001-2,(2001), ambiguity resolution trials employing various machine learning techniques (村田真樹、内山 将夫、内元清貴、馬青、井佐原均、種々の機械学習法を用いた多義解消実験、電子情報通信学会言語理解とコミュニケーション研究会)".

"Cited reference 3: Nello Cristianini and John Shawe-Taylor, An Introduction to Support Vector Machines and other kernel-based learning methods,(Cambridge University Press, 2000)", "Cited reference 4: Taku Kudoh, Tinysvm: Support Vector machines, (http://cl.aist-nara.ac.jp/taku-ku//software/TinySVM/index.html, 2000)".

After this, the summary 2 wished to evaluate is inputted to the feature extraction unit 15 (step S3). The feature extraction unit 15 extracts a set of features from the inputted summary 2 using substantially the same processing as for the solution/feature pair extraction unit 12 and these features are passed over to the evaluation extrapolation unit 16 (step S4).

The evaluation extrapolation unit 16 extrapolates what kinds of solutions are the most straightforward in the case of collecting passed over features based on the learning results in the learning results data storage unit 14 and outputs the extrapolated solution, that is to say, the evaluation 3 (step S5). For example, the evaluation extrapolation unit 16 may output an evaluation 3 of "summary by hands" or "good summary" when it is extrapolated that the solution for the summary 2 is "summary by hands" as a result of carrying out processing using machine learning technique based on the sets of features extracted from the summary 2. The evaluation extrapolation unit 16 may also output an evaluation 3 of "summary by a machine" or "poor summary" when it is extrapolated that the solution for the summary 2 is a "summary by a computer".

In the above, a description is given of practical implementations of the present invention but various modifications are possible within the scope of the present invention. For example, a description is given in the embodiments of the invention of an example where two classifications of "summary by hands" and "summary by a computer" are taken as solutions taken as solution data stored in the solution data storage unit 11, but it is also possible to take three or more classifications as solutions.

According to the present invention, the original text and the summary are taken as a problem and a large volume of solution data is prepared as solutions of either "by person" or "by machine" for summary generating means. An evaluation of whether "summary by hands" or "summary by a machine" is then extrapolated for summaries that are the subject of processing based on learning results arrived at through machine learning using this solution data. It is therefore possible for this evaluation to be automatically processed even when the subject of processing is freely created summaries. Reproducible, unbiased evaluation can therefore be carried out even for freely made summaries.

According to the present invention, an equivalent evaluation is always outputted for the same summary. The same evaluation processing can therefore be repeatedly carried out on the same summary many times and when the processing system implementing the present invention is finely tuned for superior performance, then evaluation with respect to this processing system can be achieved in a straightforward manner.

According to the present invention, it is possible to reproduce the same evaluation for the same summary and sharing of the evaluation of the summary processing method can be shared.

What is claimed is:

1. A method of evaluating a summary of more than two sentences of a document employing a computer, the method comprising:

accessing solution data storage means for storing solution data including a problem and one of predetermined solutions to the problem,
wherein the problem comprises:
a document data, and
a summary of more than two sentences of the document data thereof, and
wherein the predetermined solution comprises:
an evaluation of the summary;
evaluating the summary, comprising:
obtaining the solution, data;
extracting features from the problem by a predetermined analysis and creating a pair of a set of extracted problem features and the solution for each solution data;
learning what kind of solution is likely to be attained in a case said set of features of the solution data by using a supervised machine learning method and storing results of the learning;
obtaining an input document as a target data;
extracting features from the input document data by a set forth analysis and creating a set of the extracted input document data features;
calculating what kind of solution is likely to be attained in a case of the set of the features of the input document data based on the results of learning by the supervised machine learning method, and
outputting the calculated solution and a classification from the computer,
wherein the summary is not necessarily an extraction from the document, and wherein the solution includes a classification representing a first summary of a document, the first summary being generated by a computer, and a classification representing a second summary of the same document, the second summary being generated by a person.

2. The method of evaluating a summary according to claim 1, wherein the evaluation classification at least includes an evaluation which denotes that the summary generated by the person is appropriate or a "good summary."

3. The method of evaluating a summary according to claim 1, wherein the evaluation classification at least includes evaluation which denotes that the first summary generated by the computer is inappropriate or a "poor summary."

4. The method of evaluating a summary according to claim 1, wherein the features to be extracted include a feature regarding fluency of a sentence of the summary.

5. A apparatus for evaluating a summary of more than two sentences of a document, the apparatus comprising:
solution data storage means for storing solution data including a problem and one of proposed solutions to the problem,
wherein the problem comprises:
document data, and
a summary of more than two sentences for the document data thereof, and
wherein the proposed solution comprises:
an evaluation of the summary;
evaluating means for evaluating the summary, comprising:
obtaining means for obtaining the solution data;
solution/feature pair extraction means for obtaining the solution data from the solution data storage means and extracting features from the problem by a predetermined analysis and creating a pair of the set of extracted problem features and the solution for each solution data;
machine learning means for learning what kind of solution is likely to be attained in a case said set of features of the solution data by using a supervised machine learning method and storing results of the learning;
obtaining means for obtaining an input document as a target data;
feature extraction means for extracting features from theinput document data by a set forth analysis and creating a set of the extracted features;
calculating means for calculating what kind of solution is likely to be attained in a case of the set of the features of the input document data based on the results of learning by the supervised machine learning method; and
outputting means for outputting the calculated solution from the computer,
wherein the summary is not necessarily an extraction from the document, and wherein the solution includes a classification representing a first summary of a document, the first summary generated by a computer, and a classification representing a second summary of the same document, the second summary generated by a person.

6. A computer-readable recording medium in which a program for evaluating a summary of more than two sentences of a document, is recorded, the program causing the computer to execute the processes of:
accessing solution data storage means for storing solution data including a problem and one of proposed solutions to the problem,
wherein the problem comprises:
a document data, and
a summary of more than two sentences of the document data thereof, and
wherein the proposed solution comprises:
an evaluation of the summary data;
evaluating the summary, comprising:
obtaining the solution data;
extracting features from the problem by a predetermined analysis and creating a pair of a set of extracted problem features and the solution for each solution data;
learning what kind of solution is likely to be attained in a case said set of features of the solution data by using a supervised machine learning method and storing results of the learning;
obtaining an input document as a target data;
extracting features from the input document data by a set forth analysis and creating a set of the extracted input document data features;
calculating what kind of solution is likely to be attained in a case of the set of the features of the input document data based on the results of learning by the supervised machine learning method; and
outputting the calculated solution from the computer,
wherein the summary is not necessarily an extraction from the document, and wherein the solution includes a classification representing a first summary of a document, the first summary generated by a computer, and a classification representing a second summary of the same document, the second summary generated by a person.

* * * * *

UNITED STATES PATENT AND TRADEMARK OFFICE
CERTIFICATE OF CORRECTION

PATENT NO. : 7,328,193 B2
APPLICATION NO. : 10/352004
DATED : February 5, 2008
INVENTOR(S) : Masaki Murata It is certified that error appears in the above-identified patent and that said Letters Patent is hereby corrected as shown below:

Column 9, Line 11, change "solution," to --solution--.

Column 9, Line 48, change "A" to --An--.

Column 10, Line 9, change "theinput" to --the input--.

Signed and Sealed this

Second Day of September, 2008

JON W. DUDAS
*Director of the United States Patent and Trademark Office*